May 17, 1966 M. SCHLICHTE 3,251,945
CIRCUIT ARRANGEMENT CONSTRUCTED IN THE MANNER OF A COUPLING MULTIPLE FOR THE CONNECTION OF TIME MULTIPLEX TELEPHONE SYSTEMS
Filed Nov. 13, 1962
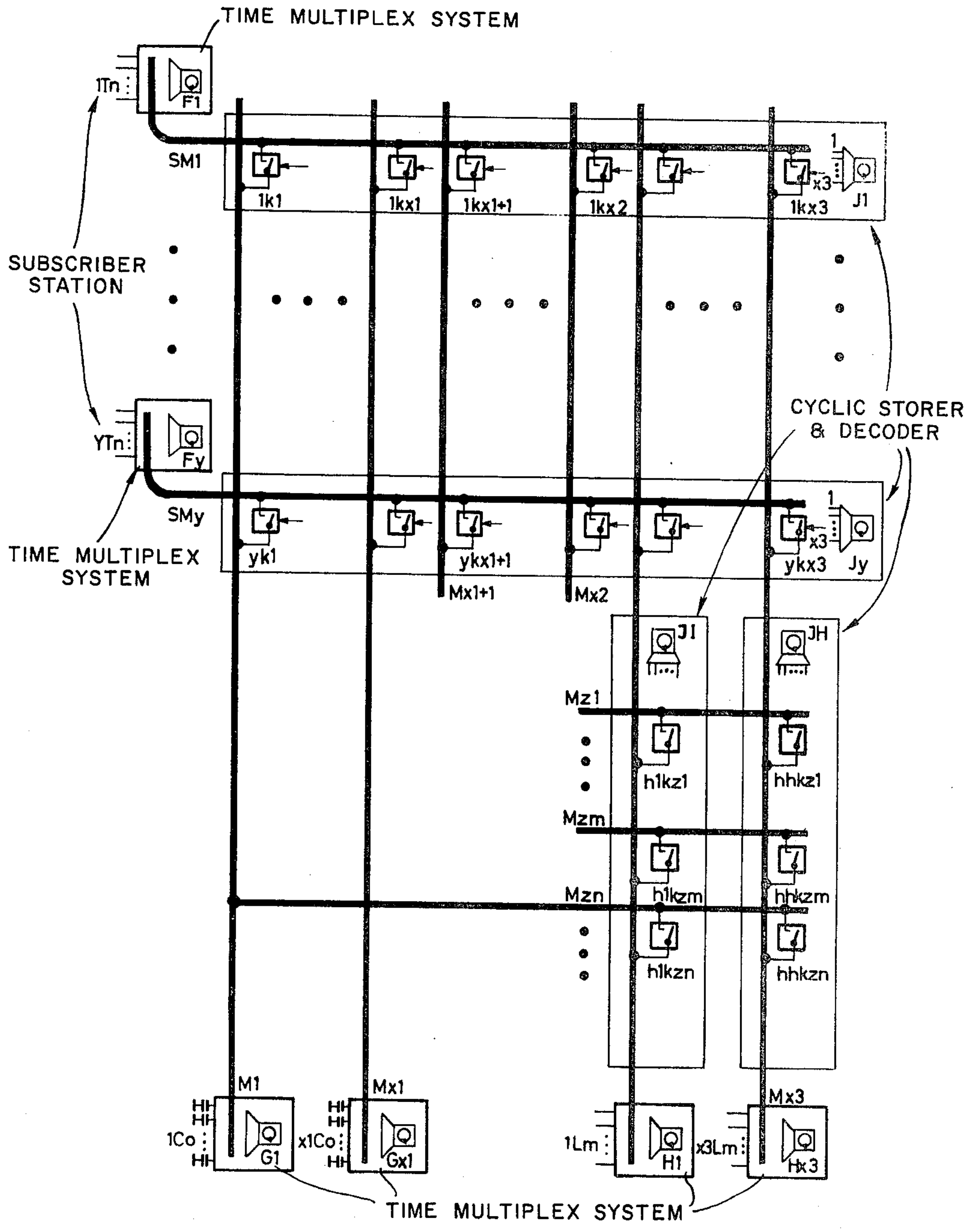

United States Patent Office 3,251,945

Patented May 17, 1966

3,251,945

CIRCUIT ARRANGEMENT CONSTRUCTED IN THE MANNER OF A COUPLING MULTIPLE FOR THE CONNECTION OF TIME MULTIPLEX TELEPHONE SYSTEMS

Max Schlichte, Munich, Germany, assignor to Siemens & Halske Aktiengesellschaft, Berlin and Munich, Germany, a corporation of Germany Filed Nov. 13, 1962, Ser. No. 237,404
Claims priority, application Germany, Nov. 16, 1961, S 76,715
4 Claims. (Cl. 179—15)

The invention disclosed herein is concerned with a circuit arrangement for time multiplex telephone systems, and may be considered in the nature of an improvement on the circuit arrangement described in copending application Serial No. 205,404, filed June 26, 1962, which is owned by the assignee named in the present case.

The copending application describes a circuit arrangement over which is conducted the traffic of a plurality of time multiplex telephone systems, each such system being provided with a call (or speech) multiplex line which is common to outgoing and incoming calls and to which the subscriber lines of the respective system are periodically impulse-wise connected with the aid of call (or speech) switches. This circuit arrangement is constructed as a coupling multiple, also referred to as crosswire multiple, to the line or row conductors of which are connected the individual call multiplex lines, thus making it possible to conduct over the column conductors the traffic between the various time multiplex telephone system, by impulse-wise closure of coupling point contacts which establish connections with the respective row conductors, and also making it possible to conduct the traffic within the respective time multiplex telephone systems, likewise by impulse-wise closure of coupling point contacts which establish connections with other particular column conductors to which are connected multiplex lines of time multiplex systems having instead of subscriber stations speech energy storers which are twice per period connectible with the respective multiplex lines; accordingly, in all these cases of operation, only one call switch need be at any instant operatively actuated in the respective systems since the speech energy storers bridge the intervals between the instants of closure of the call switches assigned to the stations which are to be interconnected for the exchange of energy between the respective subscriber stations.

In the copending application is also described a further development of the circuit arrangement, according to which there are connected to particular column conductors, call multiplex lines of time multiplex systems to which are connected, instead of subscriber stations, lines leading to other exchanges, for extending outgoing calls thereto and calls incoming therefrom, such calls being effected by the impulse-wise closure of coupling point contacts which are cooperatively related to such particular column conductors. Such further developments of the circuit arrangement therefore makes it possible to take care of the traffic occurring respectively within and between the individual time multiplex telephone systems of a given exchange in which the coupling or cross wire multiple is located, and likewise to take care of the traffic between subscribers of the systems of the respective exchange and other exchanges which are over trunk lines connected therewith. All desired connections within and between such exchanges can in this manner be normally effected.

However, it may be in given situations desirable to provide for further connection possibilities, so that trunk lines which extend from a particular time multiplex system of such a time multiplex exchange, to other exchanges or the like, can be connected not only with subscribers of time multiplex systems of the corresponding exchange, but also with other trunk lines leading to other exchanges or the like, which other trunk lines are respectively likewise connected with a particular time multiplex system of the respective other exchange. This may be the case, for example, when all regular connection paths between two remote exchanges are busy, while idle trunk lines are still available which extend from both such exchanges to the exchange in which is located the coupling circuit arrangement described in the copending application.

The invention disclosed herein will make it in such a case possible to provide a bypass connection between the two remote exchanges, which extends over the respective exchange, that is, over the coupling circuit arrangement or coupling multiple thereof over which are extended connections within and between the time multiplex systems of the respective exchange.

The present invention is accordingly concerned with an improvement applying to a circuit arrangement over which is conducted the traffic of a plurality of time multiplex telephone systems which are respectively provided with a call multiplex line to which subscribers of the respective system are by means of call switches periodically impulse-wise connectible, such circuit arrangement being, according to the previously noted copending application, constructed as a coupling multiple to the row conductors of which are connected the individual call multiplex lines, thus making it possible to conduct over the column conductors thereof the traffic between the various time multiplex systems, by impulse-wise closure of the coupling point contacts which establish connection between respectively involved row conductors, making it further possible to effect the traffic within the individual time multiplex systems, by impulse-wise closure of coupling point contacts which establish connections extending to time multiplex systems having, instead of subscribers, speech energy storers connected thereto and being with the multiplex lines thereof connected with particular column conductors, and wherein there are connected to particular column conductors call multiplex lines of time multiplex systems to which are connected trunk lines for conducting outgoing calls extending to other exchanges and calls incoming therefrom; said improvement comprising means forming in said coupling multiple special row conductors, coupling point contacts having respectively one terminal thereof connected with a special row conductor and another terminal connected with one of the particular column conductors to which is connected a call multiplex line of a time multiplex system connected over a trunk line with another exchange, thus making it possible to conduct over said row conductors the traffic between the further time multiplex systems, by impulse-wise closure of coupling point contacts cooperatively arranged with respect to corresponding column conductors. Multiplex lines of time multiplex systems having speech energy storers instead of subscribers may be connected with special row conductors, so as to effect over these row conductors, by impulse-wise closure of the corresponding coupling point contacts, connections with time multiplex systems the multiplex lines or bars of which are connected with the particular column conductors, and having trunk lines leading to other exchanges, thereby making it also possible to take care of the traffic within the respective time multiplex systems.

Further details of the invention will apear from the description which is rendered below with reference to the accompaning drawing.

In the drawing are reproduced the essential parts of the circuit arrangement which are also illustrated in FIG. 3 of the copending application, so as to indicate the principle of construction of the circuit arrangement described in the copending application. This circuit arrangement is constructed as a coupling or cross wire multiple. The coupling point contacts are arranged in crossbar-like manner in rows and columns and are row-wise and column-wise connected in multiple. Thus, the contacts $1k1$ . . . $1kx3$ are arranged in a row of the coupling multiple, one terminal of each contact being connected with the corresponding row conductor, the other terminals of the contacts being individually connected with the respective column conductors which are disposed in perpendicular crossing position with respect to the row conductors. The contacts $1kx1+1$ . . . $ykx1+1$ are in analogous manner circuited, each with one terminal on a common column conductor and the other terminal connected with a row conductor which extends in perpendicular crossing relation with respect to the column conductor. The contacts disposed in other rows and columns are similarly circuited, each with respect to a row conductor and a column conductor. Closure of a coupling point contact will effect connection between a row conductor and a column conductor. To the row conductors are connected the call multiplex lines SM1 . . . SMy of the time multiplex systems F1 . . . Fy. To these time multiplex systems are connected respective groups of subscriber stations 1Tn . . . yTn, the calls between such stations being effected by the circuit arrangement described in the copending application.

To some of the column conductors of the coupling multiple are connected the multiplex lines M1 . . . Mx1 of time multiplex systems G1 . . . Gx1 which have instead of subscriber stations speech energy storers connected thereto. The traffic within the individual systems F1 . . . Fy can be effected with the aid of these time multiplex systems G1 . . . Gx1 by impulse-wise closing, at two different pulse phases, in the manner described in the copending application, the coupling point $1k1$ . . . $1kx1$ . . . $yk1$ to connect respectively the corresponding row conductor with the appropriate column conductor.

Further column conductors such as indicated at Mx1+1 . . . Mx2, to which no particular devices are connected, serve for taking care of the traffic between the systems F1 . . . Fy, two coupling point contacts which are connected to the same column conductor being thereby closed so as to interconnect in any given case two row conductors.

There are, finally, connected to special column conductors, the call or speech multiplex lines of the time multiplex systems H1 . . . H3, which are provided instead of with substriber lines, with trunk lines leading to other exchanges for outgoing calls to be extended thereto and incoming calls received therefrom. These trunk lines are included in group 1Lm . . . x3Lm. A connection between a trunk line leading to another exchange and a subscriber station of one of the time multiplex systems F1 . . . Fy, is effected by the closure of a coupling point contact which connects periodically impulse-wise the corresponding column conductor with the appropriate row conductor. The individual circuit parts are in the accompanying drawing referenced similarly as in the copending application, and a detailed description of these parts, which are already described in and which may be had from the copending application, is therefore omitted.

According to the invention, the coupling multiple is additionally provided with row conductors Mz1 . . . Mzm, shown in the drawing. These row conductors Mz1 . . . Mzm cross the particular column conductors to which are connected the multiplex lines or bars ( . . . Mx3) of the time multiplex systems H1 . . . Hx3 which are by means of trunk lines 1Lm . . . x3Lm connected with other exchanges. At the crossing points of each of the special row lines with the particular column lines, are disposed coupling point contacts $h1kz1$ . . . $hhkz1$; . . . $h1kzm$ . . . $hhkzm$, one terminal of these contacts being connected with the corresponding row line Mz1 . . . Mzm and the other terminal being connected with the special column conductors to which are connected the call multiplex lines . . . Mx3 of the time multiplex systems H1 . . . Hx3 which are provided with trunk lines 1Lm . . . x3Lm, leading to other exchanges.

As is apparent from the drawing, there also may be connected to such special row lines which cross the special column lines, multiplex lines of systems which have speech energy storers instead of subscriber stations connected thereto. This is indicated in the drawing by the row conductor Mzn to which is connected the multiplex line of the system G1 which operates with speech energy storers instead of with subscriber stations. As shown in the drawing, the multiplex line of the system G1 can also be connected with a column conductor of the coupling multiple so as to make it possible to effect connection within the individual systems F1 . . . Fy, the multiplex lines SM1 . . . SMy of which are connected with row conductors of the coupling multile. Connections from the special row conductor Mzn to the systems H1 . . . Hx3, which are with their multiplex lines or bars . . . Mx3 connected with the special column conductors, can be effected by means of the coupling point contacts $h1kzn$ . . . $hhkzn$ which are disposed at the crossing points of the special row conductors Mzn and the special column conductors.

The traffic within and between the further time multiplex systems H1 . . . Hx3, involving trunk lines extending to other exchanges or the like, is effected in the following manner:

For example, when a connection is to be effected between a line of the line group 1Lm of the system H1 and a line group x3Lm of the system Hx3, the call switch of the involved station in the system H1—referred to in the copending application—is impulse-wise periodically actuated, thereby connecting such station periodically with the multiplex line of the system H1. The control pulse which effects this call switch actuation has a given phase position which is different with respect to the phase position of other control pulses assigned to other subscriber stations of the same system H1. Synchronously with the actuation of the call switch assigned to the subscriber station referred to is also periodically impulse-wise operated a coupling point contact cooperatively related to a special row conductor, for example, the coupling point contact $h1kzm$ connected with the row conductor Mzm. The coupling point contact $hhkzm$ is closed at the same pulse phase, such contact establishing connection between the special row conductor Mzm and the special column conductor to which is connected the multiplex line Mx3 of the time multiplex system Hx3. This results in an impulse-wise connection between the multiplex line of the system H1 and the multiplex line Mx3 of the system Hx3. The desired telephone connection is established by the cycling in the cyclic storer of the system Hx3—already described in the copending application—of the address of the desired line in the line group x3Lm, such that the resulting control pulse for the call switch which extends to the second line in the system Hx3 has the same phase position as the control pulse which governs the call switch assigned to the first line in the system H1. Accordingly, only one cyclic storer is required in each of the corresponding time multiplex systems for maintaining the corresponding connection.

The traffic between subscriber lines of one and the same time multiplex system H1 . . . Hx3 and lines or trunks leading to other exchanges or the like, instead of to subscriber lines, can likewise be effected with the aid of a cyclic storer respectively provided in such a system. Time multiplex systems are for this purpose utilized which have in place of subscriber stations speech energy storers and which are accessible over special row conductors. Such a special row conductor is the row conductor Mzn, to which is connected the system G1 having speech energy storers $1C_o$. Two control pulses of different phase position are thereby required for one and the same telephone connection. For example, if two subscriber stations of the system $Hx3$ are to be interconnected, the address of these two stations in the line group $x3Lm$ will be cycled in mutually displaced relationship, in the cyclic storer disposed in the system $Hx3$. Accordingly, both subscriber lines are by their respective call switches periodically impulse-wise, but at different instances, connected to the multiplex line $Mx3$. In order to effect the desired connection, the coupling point contact *hhkzn* is at the two instances periodically impulse-wise closed, so that the multiplex line $Mx3$ of the system $Hx3$ is connected with the multiplex line M1 of the system G1. The address of one and the same speech energy storer must then be cycled twice, in the cyclic storer of the system G1, so that two control pulses are delivered for the closure of the corresponding call switch, such pulses being in phase with the two control pulses delivered for the respective connection in the system $Hx3$. The speech energy storer which is being used bridges, in the manner described in the copending application, the instants which lie respectively between two closures of the call switches which are assigned to the respective lines of the line group $x3Lm$ in the system $Hx3$, thus effecting the desired connection between the two subscriber lines or stations of such system.

Other pairs of subscriber lines of the same line group $x3Lm$ in the system $Hx3$ can be at the same time interconnected with the aid of other speech energy storers of the system G1, without entailing any interference, since other control pulses are necessarily utilized for such purpose. Insofar as different pairs of control pulses are utilized, pairs of subcriber lines of other systems, for example, of the system H1, can additionally be interconnected even in cases in which speech energy storers are utilized which are associated with the system G1. Such calls are of course extended over other coupling point contacts, for example, over the coupling point contact *k1kzn*. In case there are, as indicated in the drawing, multiplex lines of systems having speech energy storers instead of subscriber stations, connected to further special row lines, there can even be interconnected subscriber stations the call switches of which are controlled with the aid of control pulses having the same phase position as those which are already being used for another connection. However, the corresponding telephone connections have to be extended over other multiplex lines so as to avoid mutual interference. This is, however, automatically obtained, since the same pair of control pulses in one and the same system with speech energy storers, can be delivered for only one speech energy storer, due to the fact that there is only one cyclic storer in the respective system.

There will now be briefly explained the manner in which the coupling point contacts are actuated which are connected with the special row lines. These coupling point contacts can be actuated with the aid of the same means as are described in the copending application for the actuation of the call switches. For example, there may be provided special cyclic storers in which are cycled, as addresses, code signals allotted to the respective coupling point contacts, serving for the production of control pulses which effect the impulse-wise periodic closure of the respective coupling point contacts. For example, as indicated in the drawing, such cyclic storers can be respectively allotted, each to a special row line and the coupling point contacts cooperatively disposed with respect thereto. As shown in the drawing, there are provided devices such as J1 and JH, which are respectively assigned to the coupling joint contacts *h1kz1 . . . h1kzn* and *hhkz1 . . . hhkzn*, each such device comprising a cyclic storer with a decoder and other not illustrated parts. A cyclic storer with decoder has as many outputs as there are, in the corresponding special column conductor, coupling point contacts which are respectively connected each with a special row conductor. The various coupling point contacts are in given cases actuated from these outputs. Coupling point contacts which are connected to one and the same special column conductor are thereby not actuated since different telephone connections would otherwise be connected together. One cyclic storer is therefore sufficient for the actuation of coupling point contacts disposed in a given column. Coupling point contacts which are connected to one and the same special row conductor but extend to different special column conductors, are simultaneously actuated only when they form part of one and the same telephone connection.

Changes may be made within the scope and spirit of the appended claims which define what is believed to be new and desired to have protected by Letters Patent.

I claim:

1. In a circuit arrangement constructed in the manner of a coupling multiple, over which is conducted the traffic of a plurality of time multiplex telephone systems which are respectively provided with a call multiplex line to which subscribers of the respective system are connectable, the row conductors of which are connected to the individual call multiplex lines and are connectable by coupling point contacts to column conductors thereof, which conduct the traffic between the various time multiplex systems, by closure of two coupling point contacts during the same timing pulse which establish connection between respectively involved row conductors, and particular column conductors which are connected to call multiplex lines of time multiplex systems to which are connected trunk lines for conducting outgoing calls extending to other exchanges and calls incoming therefrom, the improvement which comprises forming special row conductors in such a coupling multiple, coupling point contacts having respectively one terminal thereof connected with a special row conductor and another terminal connected with one of the particular column conductors to which is connected a call multiplex line of a time multiplex system connected over a trunk line with another exchange, thus making it possible to conduct over said row conductors the traffic between the further time multiplex systems, by closure of coupling point contacts cooperatively arranged with respect to corresponding column conductors during a timing pulse.

2. A circuit arrangement according to claim 1, wherein multiplex lines of time multiplex systems having speech energy storers connected to their respective multiple lines, are respectively connected with special row conductors, so as to effect over such row conductors by closure, during a timing pulse of a coupling point contact which establish a connection to a further time multiplex system which has its multiplex line connected with the particular column conductor, the traffic within such further system.

3. A circuit arrangement according to claim 2, wherein coupling point contacts which are respectively connected with one and the same particular column conductor and a special row conductor, are operatively controlled with the aid of code signals which are being periodically cycled as addresses in a cyclic storer.

4. A circuit arrangement according to claim 3, wherein coupling point contacts connected with one and the same row conductor and extending to different column conductors are simultaneously closed only when they are involved in one and the same telephone call.

References Cited by the Examiner

UNITED STATES PATENTS

| | | | |
|---|---|---|---|
| 2,917,583 | 12/1959 | Burton et al. | 179—15 |
| 3,015,699 | 1/1962 | Faulkner et al. | 179—15 |
| 3,049,593 | 8/1962 | Touraton et al. | 179—15 |

DAVID G. REDINBAUGH, *Primary Examiner.*

T. G. KEOUGH, *Assistant Examiner.*